Oct. 20, 1942.  F. P. MANSBENDEL  2,299,636
AUTOMATIC NET WEIGHING MACHINE
Filed Aug. 26, 1938   6 Sheets-Sheet 6
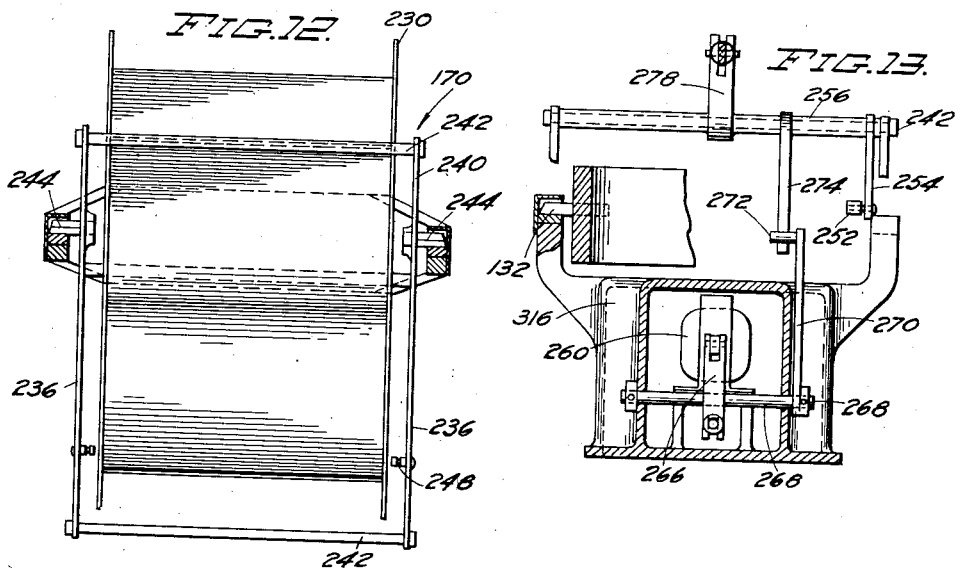
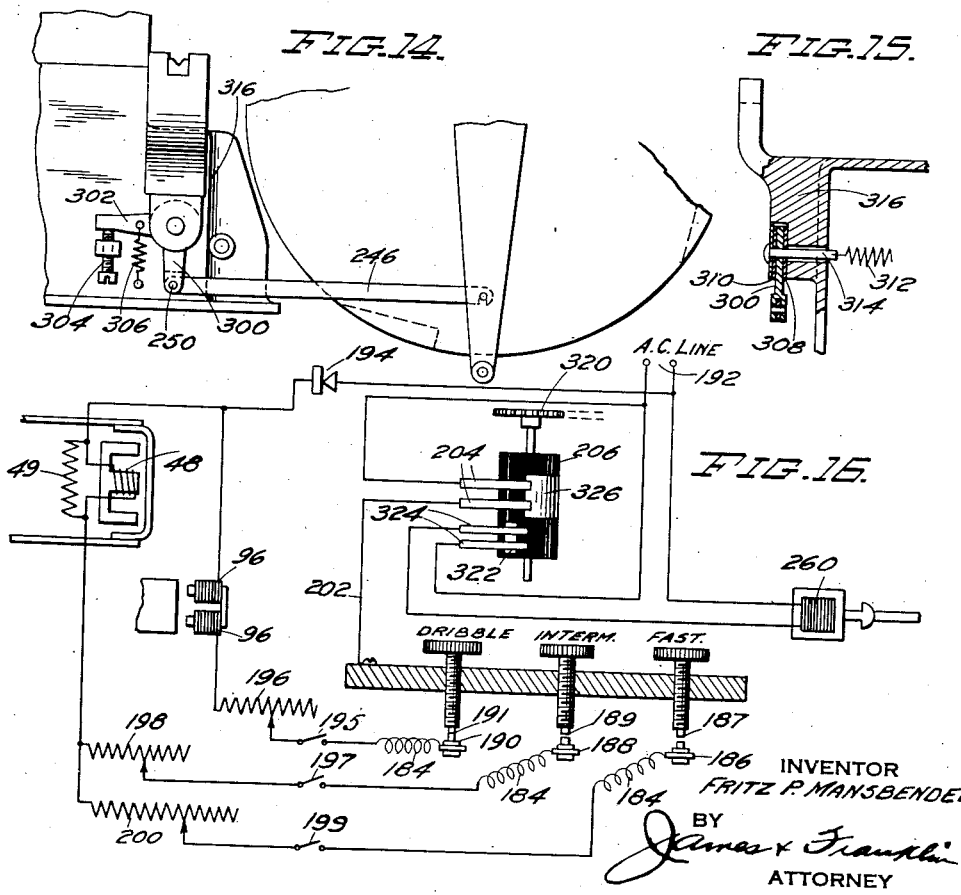
INVENTOR
FRITZ P. MANSBENDEL
BY
James F. Franklin
ATTORNEY Patented Oct. 20, 1942

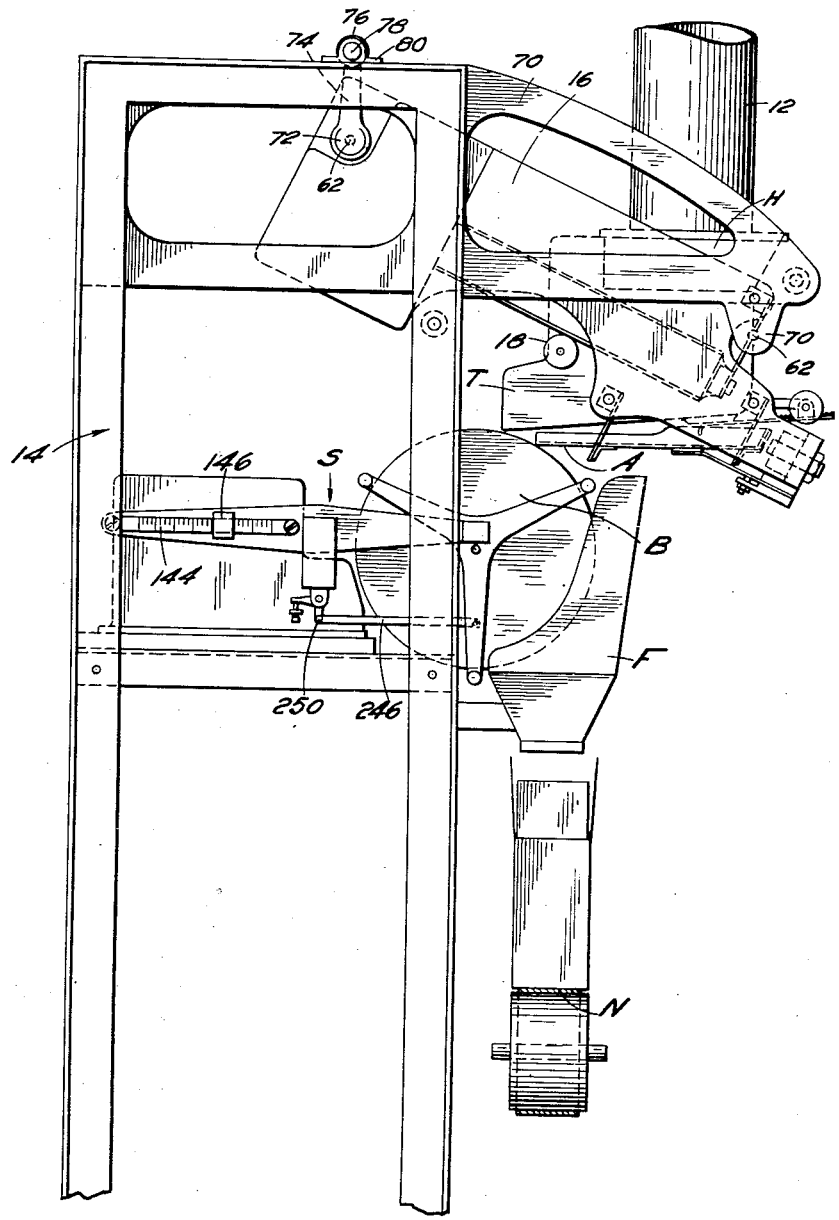

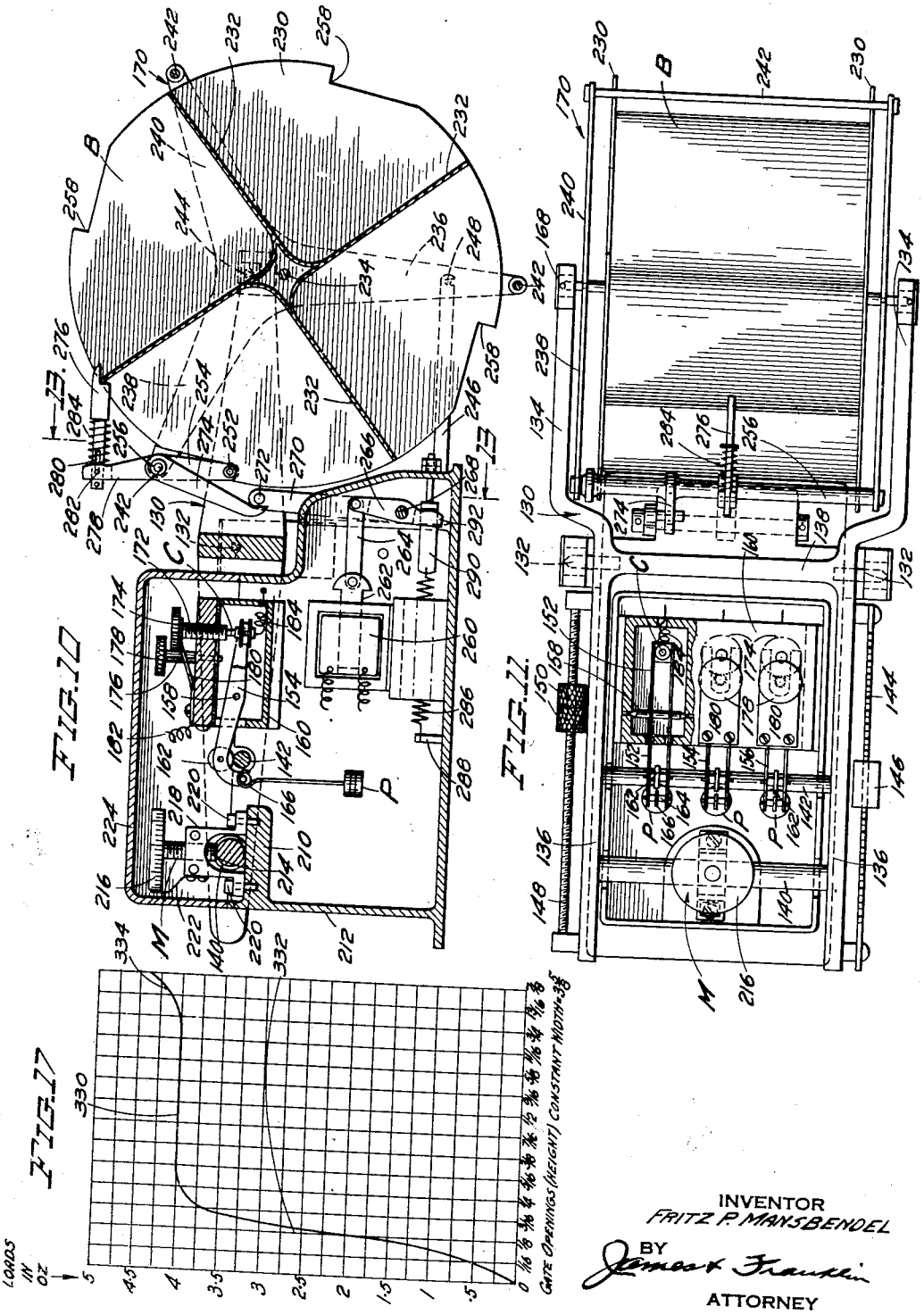

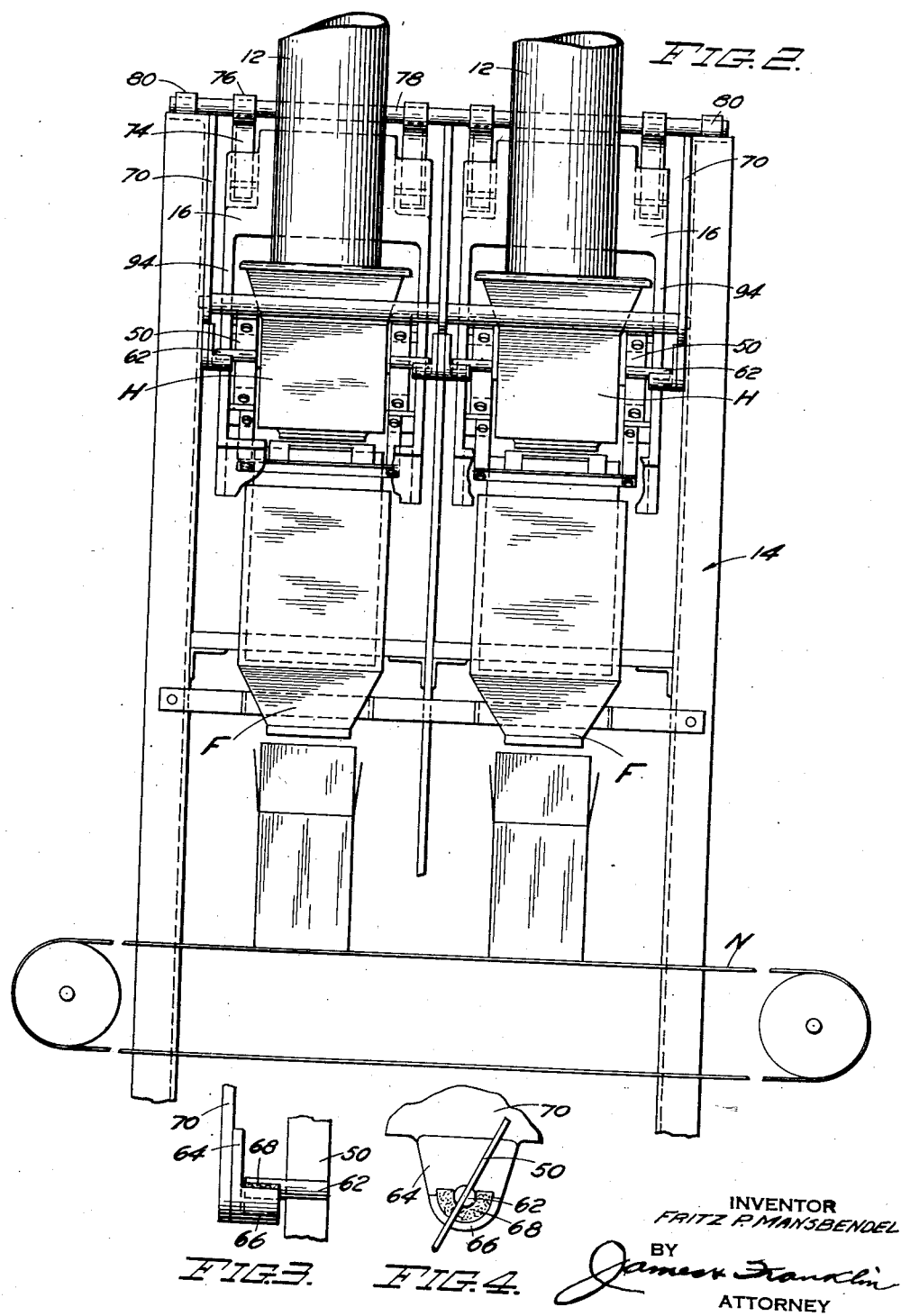

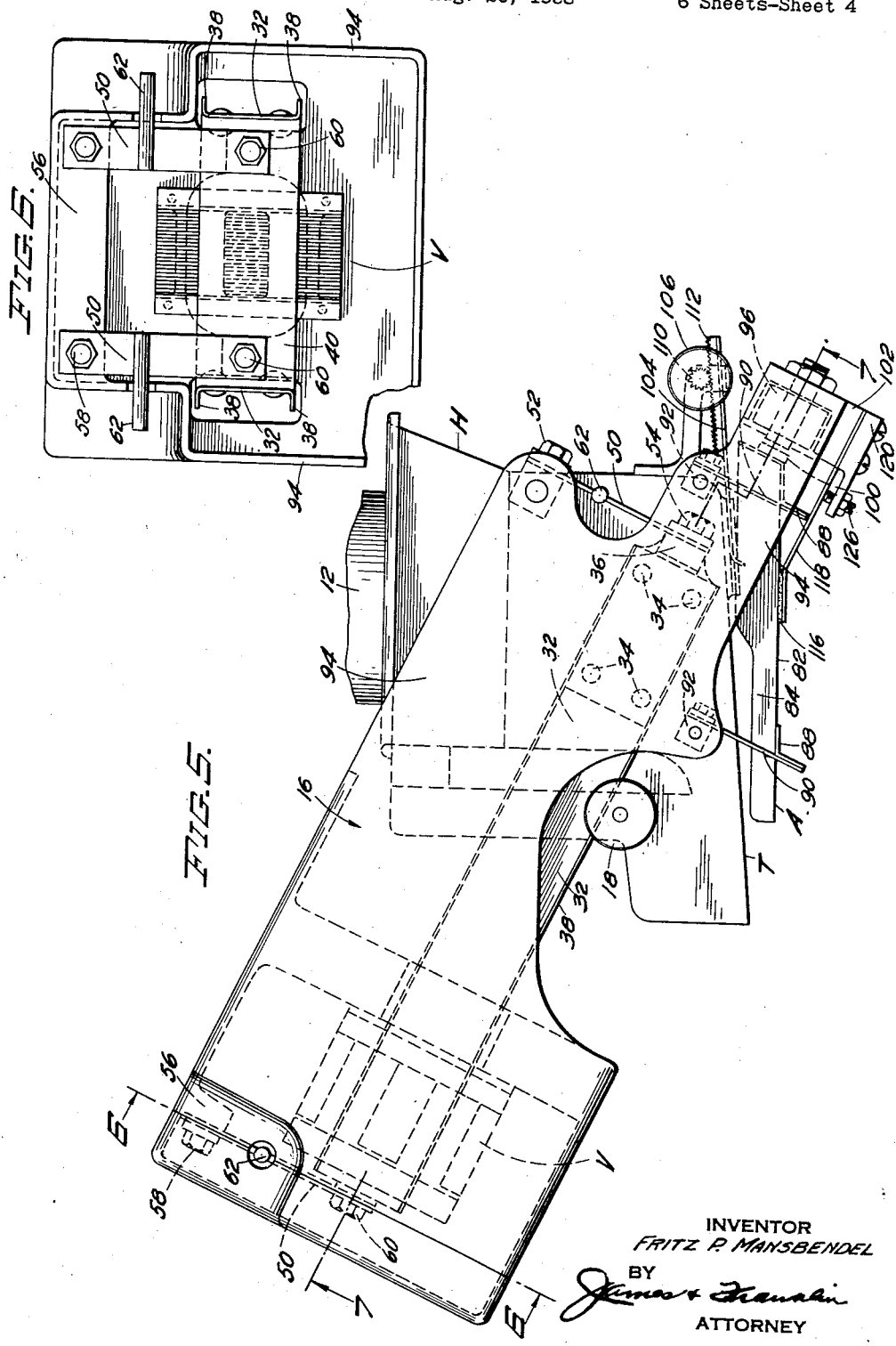

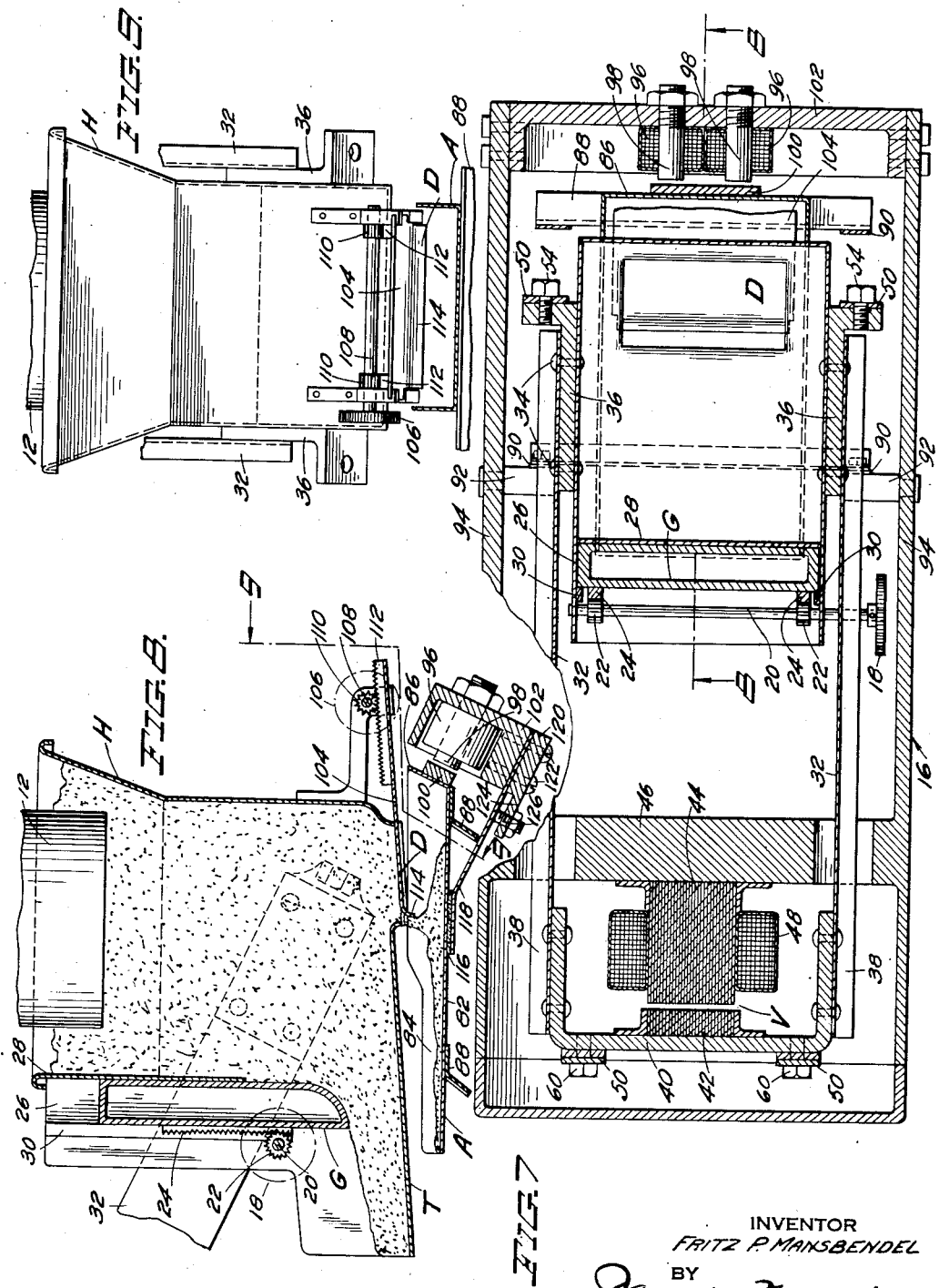

2,299,636

UNITED STATES PATENT OFFICE 2,299,636

AUTOMATIC NET WEIGHING MACHINE

Fritz P. Mansbendel, Brooklyn, N. Y., assignor to The Fred Goat Co., Inc., Brooklyn, N. Y., a corporation of New York Application August 26, 1938, Serial No. 226,870

11 Claims. (Cl. 249—20)

This invention relates to scales or weighing devices, and more particularly to automatic net weighing machines.

The primary object of my invention is to generally improve weighing machines. A more particular object is to provide an automatic weighing machine which will operate at high speed in order to work in synchronism with standard packaging machinery, yet which will produce accurate results despite the short time used for each weighing operation. Another object is to provide a machine which will measure the net weight of the contents of the package.

In a weighing machine of this class, the material being weighed is fed along a chute, as by vibrating the chute, and discharges downwardly from the end of the chute into a suitable bucket carried by the scale. Response of the scale is used to stop the movement of material along the chute. An error arises because of the weight of the falling material between the chute and the bucket. It is not feasible to minimize this error by slow feed of material because the time available for the entire weighing operation is only a matter of a few seconds. The difficulty is aggravated when dealing with a material which mats, such as tea, or a material which lumps, such as finely ground coffee or cocoa, for with such materials which are not uniformly free flowing, it is not possible to compensate for the falling material merely by timing the rhythm of the machine, for the amount of falling material is uneven. Moreover, I have found that when dealing with these materials, it is not sufficient to merely reduce the vibration of the trough near the end of the weighing operation because, unlike free flowing materials, the thickness of the layer of tea or the like at the edge or lip of the trough is not lowered by merely reducing the vibration.

Further objects of my invention are to overcome the foregoing difficulties and to provide an automatic weighing machine which will function sensitively and accurately with tea, cocoa, or finely ground coffee, or other such materials which are not free flowing. For this purpose, I provide a second or auxiliary trough from which material flows at a very slow rate, there being a mere dribble or trickle of material from this trough. It receives its supply of material through a comparatively small gate, thus breaking up clots or lumps. It has only a thin layer of material at the lip of the trough and the trough is placed at minimum height above the scale-carried bucket. In this way, the error caused by falling material is minimized and is made substantially uniform.

It will be understood, of course, that the operation of the machine is rapid because the preliminary feed from the main trough is very fast. This rapid initial discharge is interrupted when the amount of material received in the bucket approaches the desired weight but is less than the desired weight by an amount safely larger than the weight of falling material. To complete the full weight by means of the very fine dribble feed from the auxiliary trough might consume more time than is available when using the machine in conjunction with high speed packaging machinery, and in accordance with a further object and feature of my invention, the weighing operation is speeded up still further by using an intermediate feed between the fast and slow feeds. This is done by sharply reducing the vibration of the main trough. Thus, there are three speeds or stages of feed in all; the first, a high speed feed produced by substantial vibration of the main trough; the second, an intermediate feed produced by greatly reducing the vibration amplitude of the main trough; and the third, a slow speed feed produced by interrupting vibration of the main trough so that the only feed at this time is from the auxiliary trough. As will later appear, it is convenient to permit vibration of the auxiliary trough during the fast and intermediate feeds.

I have so far spoken of the feed mechanism for feeding the material to the scale bucket. Further objects of my invention center about the scale which weighs the material in the bucket and controls the feed mechanism. One such object is to so design the scale that only a minute movement of the scale is needed to control the feed mechanism. This is desirable first, in order to avoid the delay or slow operation which would be caused by any substantial movement of the scale due to the fact that a large mass (the scale poises, bucket and load) must be moved by means of a very slight force; second, in order to avoid error due to motion of the scale, for a scale in motion is not an accurate measuring device at all; and third, in order to avoid the delay and slow operation which would result if it were necessary to wait for an oscillating scale to come to rest to insure accuracy. With this object in view, I employ three sensitive and accurately adjustable electrical contacts each provided with a poise, and the scale picks up the poises successively, thereby controlling the contacts successively, which in turn are wired for control of the vibrators of the troughs. Reliable opening of the contacts may be obtained with a very small movement, say, 2/1000". Hence, the entire scale movement may be limited to a small amount, say, 8/1000" or 10/1000". The poises are readily changeable to change the relative distribution of the amounts of fast, intermediate and slow feed. The total weight being delivered is also readily changed, as by means of a sliding weight on the scale beam. The contacts are preferably provided with micrometer screws for adjusting the same, and to facilitate this adjustment, an additional micrometer screw and scale may be provided for limiting the movement of the scale beam.

Still another object of the invention centers about the bucket on the scale. This is preferably of the tilting type and is provided with a number of compartments which are successively moved into weighing position as the preceding compartment is moved to discharge position. The compartments are so disposed relative to the center of the bucket assembly that the weight of material in the bucket tends to tilt the bucket. A detent prevents tilting until completion of the weighing operation, this detent preferably being operated in synchronism with the packaging machine. In accordance with features of the present invention, a pusher or kick-off device functions upon release of the detent to positively insure tilting of the bucket even if the load being weighed therein is very slight, and a shock absorber is provided to absorb any shock at the completion of the tilting of the bucket when the bucket strikes the detent.

The machine here disclosed is a precision device designed to work within very close requirements for the net weight of material. The scale is, therefore, a sensitive device, and it and its associated parts are pivoted on delicate and preferably jewelled bearings. It is desirable to avoid vibration of the scale such as might be transmitted to it by reason of the vibration of the main feed trough. This object is fulfilled in the present invention by mounting the scale in a main frame, and mounting the feed trough on an auxiliary or feed frame, and securing the feed frame to the scale frame in a manner which will prevent any vibrations being transmitted from the feed frame to the scale frame. The feed frame is massive relative to the trough and it carries an electromagnet which is also very massive. The armature vibrated by said magnet is connected to the trough. The trough is conventionally supported on the feed frame by means of strip springs. In accordance with my invention, this feed assembly is mounted in the main frame by attachment at the neutral or nodal points of the spring strips, so that vibration of the trough is accompanied by an opposite though much smaller vibration of the feed frame, while substantially no vibration at all is transmitted to the main frame or to the scale.

To the accomplishment of the foregoing, and other more specific objects which will hereinafter appear, my invention consists in the feed and scale and feed control elements, and their relation one to the other, as hereinafter are more particularly described in the specification and sought to be defined in the claims. The specification is accompanied by drawings, in which:

Fig. 1 is a side elevation of an automatic weighing machine embodying features of my invention;

Fig. 2 is a front elevation of the same constructed as a twin or double unit;

Figs. 3 and 4 illustrate a detail of the suspension of the feed mechanism in the main frame of the machine;

Fig. 5 is a side elevation of the feed mechanism;

Fig. 6 is an end elevation of the feed mechanism looking in the plane of the line 6—6 of Fig. 5, i. e. with the end cover removed;

Fig. 7 is a section taken in the plane of the line 7—7 of Fig. 5;

Fig. 8 is a section taken in elevation through the feed troughs, this section being in the plane of the line 8—8 of Fig. 7;

Fig. 9 is a partially sectioned end elevation of the feed mechanism taken in the plane of the line 9—9 of Fig. 8;

Fig. 10 is a section taken in elevation through the scale and bucket mechanism;

Fig. 11 is a plan view of the same with the scale cover removed;

Fig. 12 is a partially sectioned end elevation of the same;

Fig. 13 is a transverse section taken approximately in the plane of the line 13—13 of Fig. 10;

Fig. 14 is explanatory of damping or shock absorbing mechanism for the tiltable bucket;

Fig. 15 is a section through the same;

Fig. 16 is a schematic wiring diagram for the machine; and

Fig. 17 is a graph explanatory of one feature of the performance of the machine.

The material being weighed and packaged is dumped into a suitable large main hopper which is not shown in the drawings and which ordinarily is located on a floor above the packaging and weighing machine. Referring to Figs. 1 and 2, a feed pipe 12 descends from this overhead main hopper and leads into the hopper H of the weighing machine. In Fig. 2, it will be noted that there are two feed pipes 12 and two hoppers H, the invention as here illustrated being a double or twin unit, so that the machine may be used with a packaging machine having twice the capacity of each weighing machine. The material flows through hopper H onto a main feed trough T, as is best shown in Figs. 5 and 8, and the discharge end of trough T is disposed over a tiltable bucket B, as is best shown in Fig. 1. The nature of the bucket with its multiple compartments will be seen in Fig. 10. Material is fed from hopper H along trough T by suitable means, in the present case by electromagnetic vibrator means, best shown at V in Figs. 6 and 7, and the thickness of the body of material in trough T is controlled by means of a valve or gate G (see Fig. 8). This thickness of material will usually be considerable in order to make rapid feed possible. To avoid error caused by material falling from the edge or lip of trough T, the vibration of the trough is reduced toward the end of the weighing operation, and is stopped altogether near the end of the weighing operation, a dribble feed then continuing at a very slow rate by means of auxiliary feed trough A disposed beneath main trough T. As is best shown in Fig. 8, trough A receives material from hopper H through an adjustable door D, the opening of which is made small in order to keep the material in trough A at a low level and in order to break up any clots or lumps in the material. It will also be noted that while main trough T is disposed at a downward angle to facilitate rapid discharge, the trough A is substantially horizontal, thus expediting the production of a very slow dribble of material therefrom.

The operation of the feed mechanism is controlled by a weighing scale generally indicated at S in Fig. 1 and shown in greater detail in Figs. 10 and 11, the beam of said scale carrying the bucket B at one end and being arranged to successively lift a series of poises P at the opposite end, each of said poises being associated with an electrical contact C. The movement of the scale beam is purposely limited to a very slight amount, merely sufficient to open the contacts, and the contacts are adjustable by means of fine screw mechanism. The movement of the scale may be controlled by means of a micrometer screw M during adjustment of the contacts.

Reverting to Figs. 1 and 2, at the completion of the weighing operation, the bucket B is tilted, thus discharging the weighed contents into the chute or funnel F which guides the material into the packages or cartons receiving the same. These are moved along by any suitable means, such as the conveyor belt N, which transfers the packages from the packaging machine to a closing device for closing and sealing the packages.

The weighing scale is mounted in a main frame 14, while the feed mechanism is mounted on an auxiliary or feed frame 16, and the latter is so mounted in the main frame that vibration causing discharge of material from the feed troughs is not transmitted to the main frame nor to the scale.

The weighing scale is arranged to operate on a definite predetermined time cycle, which ordinarily will be controlled by the packaging machine. The rate at which this scale operates is of the order of 25 to 30 loads per minute, the dumping of the load occurring at regular timed intervals. While the charging periods are undetermined they must nevertheless be completed within the maximum time available for loading, and are controlled by the scale itself to suit the variations in the rate at which material is fed to the bucket by the feed means. Because of the relatively short time available for loading, every unnecessary movement in connection with the action of this scale must be avoided to leave the greatest possible time margin for the weighing operation.

The feed of the material to the scale is controlled by the action of the scale, i. e., when the scale has received a predetermined amount of material the scale will cause the feed to be shut off and remain idle until the load is to be dumped, after which the feed is resumed and the operation is repeated. When the load is appreciable, say one-half pound to one pound, and the time for weighing is small, say one and one-half to two seconds, the rate of feed of the material into the bucket is determined, it being approximately five to ten ounces or more per second. Ordinarily when a required amount has been fed into the bucket and the feed is suddenly interrupted, the portion of material which is still falling from the edge of the feed trough to the top of the material in the bucket, whatever the amount of this material may be, will ultimately be added to the load in the bucket and will result in a considerable overweight.

To correct for this deficiency, a counterweight on the scale beam might be shifted to call for a lesser load, and where the feed is very uniform this method of compensation may result in fairly correct weights being obtained. Where the feed is not uniform the results will not be satisfactory. To overcome this difficulty it has been suggested to feed in two steps, first a coarse or bulk feed, and then a dribble feed, the latter reducing the amount of material falling after the final cut-off to a relatively small amount. But even this method is not entirely satisfactory for it prolongs the weighing time considerably owing to the fact that the amount of material falling at the end of the bulk feed determines the amount of the dribble feed (the latter necessarily being an amount greater than the falling material), otherwise the dribble feed would not be effective.

The present scale operates in three stages, that is, a fast feed, an intermediary feed, and a slow or dribble feed. Moreover, the discharge end of the feed trough is brought very close to the top of the loaded material in the bucket, this distance being of the order of one-half inch or less. The gain in time because of the short dribble period makes it possible to feed the bulk of the material at a relatively slower rate, and the total amounts needed to be added by the intermediary and dribble feeds can be made correspondingly small, the former being of the order of one-half or three-quarters of an ounce, and the latter approximately one-tenth of an ounce. This arrangement results in a better utilization of the total time available for weighing.

The three feeds, fast, intermediary and slow, are controlled by the scale in three distinct steps, each step stopping its respective feed when the required amount has been delivered to the bucket. The proportions of the three weights to be deposited into the bucket are determined more or less arbitrarily and must, of course, total the desired weight. For best results the main feed weight should be large in proportion, the dribble weight as small as possible, and the intermediary weight somewhere between the two. It is important, however, that the intermediary and dribble weights respectively be so chosen that they are somewhat larger than the weight of the falling material following the preceding feed, otherwise their function will be entirely defeated, for if the amount of falling material is larger than the amount called for by the succeeding step, the scale is already overloaded when this faling material has finally dropped into the bucket, and the intended function of the intermediary or the dribble feed, as the case may be, cannot be fulfilled.

In the specific machine here illustrated, the arrangement is such that at the beginning of the feeding operation all feeds operate simultaneously. When the bulk load has been deposited in the bucket, the fast feed is interrupted or shut off and from then on only the intermediary and the dribble feeds operate together. After the intermediary load has been added to the bulk load, the intermediary feed is shut off and then the dribble feed continues until the exact weight is in the bucket, whereupon all feeding stops instantly with practically no falling material following.

The parts of the machine are described in greater detail hereinafter.

The feed mechanism

The feeder proper consists of a box-like container or hopper H provided with a funnel on top and a short spout or trough T on the discharge side. Separating the interior of the box from the spout or trough is a gate G which can be raised or lowered. The material is fed into the interior of this container through a vertical pipe 12 ending just below the rim of the funnel of the container and of a diameter smaller than the rim of the funnel. The container is mechanically secured to an apparatus which includes the magnetic means V for imparting to its longitudinal cyclic motion, whereupon the material in the container will be forced through the gate opening on to the trough or spout and eventually discharged into the bucket. The manually set gate opening will regulate the rate of feed within certain limits. This action is to stabilize and control the rate of feed for a certain setting of the amplitude of vibration of the feeder magnet, and within limits, this rate is nearly proportional to the gate opening.

This main feeder serves as a feeder for the two first feeding operations, i. e., the fast and the intermediary feeds, utilizing the same gate opening for both. The third or slow feed is accomplished by means of an entirely separate feeding mechanism located under the main feeder and discharging also into the scale bucket. This slow feeder is a shallow trough A properly suspended by flat springs and controlled by means of an independent vibrating magnet and arranged to receive its material from an opening at D in the main feeder container directly above, and towards the rear of the trough. During the fast and intermediary feeding period, while the main feeder container is kept agitated by the feeder vibrations, some of the material drops through the opening in the bottom of the container onto the dribble feed trough and is discharged into the bucket as an independent stream during the entire weighing operation. When fast and intermediary feeding ceases, the dribble feed continues for a short time, and by regulating the vibrations of the dribble feeder, a perfect smooth slow dribble can be obtained with resulting accurate weights.

The independent dribble feed mechanism is particularly important when non-free flowing materials such as tea or very finely ground coffee, or cocoa is to be handled. With a certain gate opening and setting for the amplitudes of fast feed and intermediary feed respectively, these materials are discharged at a constant cross-section, the main difference when changing from fast to intermediary feed being that the material advances bodily at a lesser rate of speed. The desideratum is, of course, to reduce the discharging levels of the material, and for free-flowing material such as sugar and jelly powder, this may be accomplished by merely reducing the amplitude of vibration. With such materials, as soon as the amplitude of vibration is reduced, the level at the edge where the material leaves the trough drops, thus reducing the amount of material overhung or falling, and a dribble may be obtained with a material height sufficiently low to give fairly satisfactory results. But with materials of a non-free flowing type, the gate must be opened wide in order to allow sufficient material to pass. Moreover, any restriction or impediment interposed in its travel will affect practically the entire cross-section of the material and its flow will be greatly restricted. What might be a satisfactory dribble feed for free flowing material becomes impossible with non-free flowing material because the particles of material clink together and are not easily separated. This difficulty is overcome when a relatively small amount of material is deposited on an independent dribble feed trough from which it is discharged at any desired rate into the bucket, adding just enough material to the load to bring the weight to the exact amount desired without loss of time or delay.

Referring now to the drawings, and more particularly to Fig. 8, the open lower end of feed pipe 12 terminates within hopper H, and the material fills the hopper and flows beneath gate G and along trough T. The gate is adjusted by means of a knob 18 which turns shaft 20 (Figs. 7 and 8) carrying spaced pinions 22 meshing with racks 24 secured to the outside of the gate G. The gate is guided in its vertical movement by means of a track 26 formed at each side of the trough between wall 28 and a guide rail 30.

The feeding of the material along the trough is important. It should be as uniform as possible, that is, whatever means are employed to move or feed the material towards and into the bucket, should deliver this material at a nearly constant and unvarying rate. If it were possible to feed at a perfectly uniform rate, the weighing of material by means of scales would not be necessary, and a timed flow would suffice. It is the lack of perfect uniformity that makes the use of the scale necessary, and the scale must be able to function within the range of the feed variations, i. e., whether the feed is at its highest or lowest, the scale must be able to control the amount of material it receives with accuracy and shut off the feed when the desired weight has been deposited in the bucket. The more uniform the feed, the less difficult is the problem of scale design.

For this particular machine I use what is known as a vibrating feeder. By imparting to the trough a forced cyclic longitudinal and slightly oblique motion, so timed that the forward stroke is slower than the return stroke, a forward motion of the material in the trough takes place. This cyclic motion can be accomplished in various ways, as by means of a combination of electromagnets and springs. I employ the latter system. It has the advantage in the ease with which the vibrations can be controlled, since the amplitudes of these vibrations depend on the current used in the magnet to sustain the forced vibratory movements, and this current can readily be regulated by a resistor, and interrupted by the weighing scale.

The trough T acts as the bottom of hopper H, and vibration is imparted to the hopper and trough as a bodily unit. For this purpose, a pair of longitudinally reciprocable arms 32 (Figs. 5 through 9) are secured to the sides of hopper H, as by means of rivets 34. Brackets 36 are preferably interposed between arms 32 and the hopper, as is best shown in Figs. 7 and 9. The arms 32 are channel-shaped, being formed of strips of heavy gauge sheet metal the edges of which are bent outwardly to constitute flanges 38 which stiffen the arms.

The remote ends of arms 32 are secured to a U-shaped member 40 (Fig. 7) which carries a laminated armature 42 which is vibrated by means of an electromagnet the laminated core 44 of which is secured to a cross-bar 46 of feed frame 16. The magnet coil is indicated at 48. Considering the feed frame 16 to be stationary, the movable parts are then the armature 42, the member 40, the channeled arms 32, and the hopper and feed trough. The movable parts are suspended for movement relative to the feed frame by means of four spring strips 50. Those at the hopper end are best shown in Fig. 5, and it will be seen that the upper ends are secured to the frame by bolts 52, while the lower ends are secured to the brackets of angle pieces 36 by bolts 54. The spring strips 50 at the magnet end are secured at their upper end to an appropriate cross-bar 56 of frame 16 by means of bolts 58, and are secured at their lower ends to the U-shaped member 40 by means of bolts 60. Vibration of the feed trough relative to the frame 16 is thus accommodated by the elasticity of the spring strips 50.

There are several advantages in using spring strips for this purpose. One is that it provides a restoring force so that the action of the electromagnet may be unidirectional. Specifically, alternating current from a regular power supply line is passed through a single wave rectifier, and the rectified or pulsating unidirectional energy is supplied to the magnet coil 48. The armature is sharply attracted and is more slowly restored to initial position during the interruptions of current. The trough is thus given a backward movement sharper than its forward movement, which leads to definite movement or transfer of the material along the trough.

A second advantage of the spring strips is that they make possible what may be termed a "nodal" suspension of the feed mechanism.

Owing to the fact that the feeding mechanism and the scale are mounted on one and the same frame structure, and that the feed mechanism vibrates appreciably when in operation, the scale with its delicately set contacts is more or less subjected to vibrations transmitted to it through the supporting structure. Such vibrations as reach the scale may affect the results, for they prevent a smooth working of the parts involved in breaking the electric contacts. It is possible, however, to reduce the vibrations transmitted to the frame structure to a negligible minimum, whereby the scale will be entirely relieved of this trouble.

The vibrating feeder consists essentially of the container to be vibrated, an electromagnet, and an armature, the latter being attached to the container and acting upon the same, and a spring support for the armature and container. These elements must be held in a definite spacial relation to each other, which is done by mounting all of the parts on an independent frame work, which I shall term a "feed frame." The container is supported from the ends of leaf springs having their opposite ends firmly anchored to the feed frame. The magnet, likewise, is solidly anchored to the feed frame, and is mounted in such a manner that it will co-act with the armature attached to the container and produce a movement of the latter in the desired direction. The recoil of the electromagnet is reduced as much as possible by making the feed frame heavy and ponderous, which in effect will allow the useful vibrations of the container to reach their maximum amplitude for any setting of the driving current. However, even though the feed frame is made heavy, appreciable recoil forces will always be present, although their amplitudes of vibration are reduced, especially since the weight of the feed frame cannot be increased beyond a practical limit. If now this independent system were to be directly attached to, or supported from, the main frame which also contains the scale, these recoil forces would be transmitted to the frame and affect the scale, which is objectionable.

The vibrating system operates in such a manner that the recoil causes the vibrator magnet and the weight attached to it to vibrate in one direction while the armature and the container to which it is attached is vibrating in the opposite direction. Since these two elements are attached to the ends of the same leaf springs, the respective ends of the springs must likewise vibrate in opposite directions. If this is the case, there must exist on the springs somewhere between their ends, a point which will be neutral, a sort of nodal point which does not vibrate. Such a point can indeed be found very easily, and in the case here illustrated is located about one-third of the length of the spring from its anchorage to the feed frame. It depends on the relative masses of the parts. By establishing the physical supporting connection between the feed system and the main frame at this nodal point, the transfer of vibration from the one to the other will be almost entirely eliminated and the scale will not be called upon to operate under a handicap.

In the drawings, it will be seen that I provide rods or trunnions 62 projecting sidewardly from the strips 50, the inner ends of said rods being split to receive the spring strips 50 and being welded or otherwise secured thereto. The outer ends of the rods 62 are received in suitable bearings. The rods at the hopper end of the feed frame are supported by brackets, best shown in Figs. 3 and 4 of the drawings. Each bracket comprises a flat mounting wall 64 carrying an arcuate support wall 66. A body 68 of soft sponge rubber or the like is disposed between trunnion 62 and support wall 66. The walls 64 are secured to side plates 70 (Figs. 1 and 2) of the main stationary frame 14 of the machine. The rods 62 at the magnet end of the feed frame are received in the lower ends 72 of oscillatable arms 74, best shown in Figs. 1 and 2. The upper ends 76 of these arms are supported by a rod 78 extending across the main frame of the machine and held at its ends by bearings 80.

The auxiliary trough A is formed of heavy gauge sheet metal bent to provide a bottom wall 82, side walls 84, and an end wall 86. The bottom wall 82 is stiffened and supported by angle bars 88 extending transversely thereacross. These in turn are secured to the lower ends of spring strips 90 (Fig. 5), the upper ends of which are secured to bearing blocks 92 which in turn are mounted on the side plates 94 of the feed frame 16. It will be noted that the springs 90 are disposed at an angle and the same applies to the feed frame and the springs 50. This angular disposition of the springs helps produce feed of material along the troughs, for the return or backward movement is downwardly away from the material and is of less effect than the spring actuated forward movement, which is upwardly and therefore bears harder against the material to help move the same with the trough.

The auxiliary trough A is vibrated by means of magnet coils 96 surrounding cores 98, as is best shown in Figs. 7 and 8 of the drawings. The magnet acts upon an armature 100 which is secured directly to the end wall 86 of the trough. The magnet is mounted on a channel-shaped cross-member 102 extending between the side walls 94 of the feed frame. The magnet axis is inclined and is preferably approximately perpendicular to the support springs 90. It will be evident that the electromagnetic action is much the same as that described for the main trough, for upon energization of the magnet, the trough is pulled rearwardly and downwardly, and upon de-energization of the magnet the trough is restored under the influence of the supporting springs, the movement then being forwardly and upwardly. However, inasmuch as the mass of the auxiliary trough and the range of vibration are small, it is unnecessary to bother with the refinement of securing the support springs at their nodal points, for the amount of vibration transmitted to the main frame and scale is negligible. It will be understood that the vibration of the main trough T and hopper H is of advantage in shaking some of the material therefrom into the auxiliary trough A, as is next described.

The auxiliary trough A is fed with material through a slit or opening provided by door D. Door D consists of a plate 104 reciprocable by adjusting means including a knob or handle 106 which turns a shaft 108 carrying a pair of spaced pinions 110 which mesh with racks 112 carried by plate 104. The plate is slidable in guide grooves formed at the bottom of hopper H, and the edge of the door is turned downwardly, as shown at 114, between the guide grooves, in order to form a smooth passage for material passing from the hopper into the auxiliary trough.

The vibration of trough A may be dampened or controlled by means of a brake pad 116 (Figs. 5 and 8) formed of cork or other suitable substance, this pad being carried at the upper end of a brake strip 118 the lower end of which is secured to the bottom of cross-bar 102 by means of a bracket 120 and screws 122. Bracket 120 has a forwardly extending arm 124 carrying an adjusting screw 126 for regulating the braking action on trough A.

The feed from trough A is kept small because of, first, the small opening at door D which results in only a thin layer of material on the trough; second, the horizontal disposition of the trough; third, the small range of vibration of the same. The error due to falling material is minimized by the thin layer of material at the lip of the trough and by the low rate of feed from the trough. Also, non-uniformity due to clots or lumps is minimized because such bunches of material are broken up in the course of passage through the small door opening. Finally, the error due to falling material is minimized by reducing the vertical distance of the trough above the bucket. Thus, referring to Fig. 1 of the drawings, it will be seen that the main trough T is as near as possible to revolving bucket B, and that auxiliary trough A is even less in vertical distance from the bucket compartment.

The scale

The scale is a beam balance, having on one side a sliding weight astride a graduated bar attached to the scale beam and on the other side a revolving drum type bucket to receive the load.

A scale which will function so as to respond to a succession of three separate weights, the total of which is to be the desired weight, may be, in principle, as follows. The scale first balances with a poise weight I on the weight pan for the first step. Suspended above the weight pan but not touching it is another poise weight II which the scale has to balance in addition to I for the second step. Again suspended above the pan and slightly higher than poise weight II is poise weight III which the scale has to balance in addition to I and II for the third and final step. It has been assumed that the scale is allowed to move sufficiently after each balance is obtained to pick up the next poise weight until all three weights are on the scale pan and balance is obtained. These movements, however, are subject to definite limitations.

Correct weight on any beam balance is obtained when the moments on both sides of the center pivot or knife edge are exactly alike. This, of course, is a static condition and there should not be any movement of the scale beam. If such a balanced scale moves, it is because the equilibrium of the system has been disturbed by outside means and this equilibrium is, after a time, restored, as by a pendulum weight attached to or acting on a scale beam providing a restoring force, or by means of a spring doing the same thing. The motion of the scale during this restoring period is no indication of the conditions of the weights on both sides. They may be exactly alike or else not alike and only nearly so.

Moreover, wherever a scale is provided with an element for bringing the scale into a definite zero position as a condition for an exact balance, there must be movement of the scale from an unbalanced position to the zero position. With a given weight of beam, scale, pans, bucket, poise weight and the material in the bucket, such movements are relatively slow for small differentials in weight. They are slower when the differentials are smaller, i. e., where great accuracy is required, so that if differentials must be kept very small, the motion of the scale, if it moves at all for whatever reason, is necessarily slow. This slowness of motion consumes an amount of time which is not available in high speed automatic weighing, for every tenth of a second must be utilized to the fullest extent. It must be remembered that the scale operates on a three step schedule, that is, it must complete three distinct weighing operations in the few seconds time allowed for the entire operation. Hence, the motion of the scale should be limited to save time.

If, after the close of the fast feed operation the scale is allowed to move considerably, thereby gaining momentum while the intermediary feed is still in effect, the scale may over-shoot its mark, that is, it may pick up weight II and possibly also weight III since these weights are relatively small. By so doing the scale would prematurely shut off these respective feeds even though the weight in the bucket is lacking the desired amount for which the scale is set. This is another reason to limit the scale movement.

I have, therefore, limited the movements of the scale to those required to break an electric contact and not more, these movements being of the order of two thousandths of an inch, or less than the thickness of a sheet of paper. That is to say, the scale will move through this small distance when changing from one step of feed to the next step. Such small movements, while giving a satisfactory contact breaking performance, reduced the time of action and the acquired momentum of the scale to an amount which is not disturbing to the normal operation of the scale.

Referring now to Figs. 10 and 11 of the drawings, the scale comprises a beam 130 pivoted on knife edge bearings 132. Beam 130 comprises arms 134 at one side of fulcrum 132 for carrying the bucket B, and arms 136 on the other side of fulcrum 132. These arms are connected by means of cross-bar 138 and cross-rods 140 and 142. A graduated bar 144 (Figs. 1 and 11) is secured alongside one of the arms 136 and carries a slidable poise 146. A threaded rod 148 (Fig. 11) may be provided alongside the other arm 136 and carries knurled nuts 150 for adjustment of the scale.

The contacts C are constructed as follows. The upper contacts are stationary, while the lower contacts are movably carried by contact arms 152, 154 and 156. These arms are pivoted on bearings 158 carried in the compartments of a contact housing or box 160. The outer ends of the contact arms project out of housing 160 and pass over the cross-rod 142. To minimize frictional engagement between cross-rod 142 and the contact arms, the latter are preferably provided with small anti-friction wheels 162. The ends of contact arms 152, 154, and 156 are then turned downwardly and include freely rotatable rods or bearings 164 on which the poises P may be hung by means of hooks 166. It will be noted that the arrangement of the parts is such that bearings 158 of the contact arms and points of contact between cross-rod 142 and wheels 162 are in substantial alignment with the knife edge bearings 132 of the scale beam.

The upper contacts are formed at the lower ends of finely threaded screws 172. These are provided at their upper ends with heads cut to form gears 174. These gears mesh with pinions 176 turned by knurled knobs 178. In this way, very fine adjustment of the stationary contact may be obtained. The adjustment is maintained by springs 180 the stationary ends of which are secured to the top of the contact housing and the movable ends of which are bifurcated to straddle the adjusting screws and bear upwardly against the bottom of gears 174, as is best shown in Fig. 10.

Connection is made to the upper contacts by means of a conductor 182 (Fig. 10) grounded on the contact box 160. Individual connections are made to the lower contacts by means of thin coiled and highly flexible leads 184. These leads are so designed that there is negligible resistance to movement of the contact. It will be understood that the adjustment of the contacts is progressively different. Thus, referring to Fig. 16, I there show the condition which obtains during the final or dribble feed stage. It will be observed that movable contact 186 has been depressed substantially below stationary contact 187; movable contact 188 has been depressed below stationary contact 189; and the movable contact 190 is still in engagement with stationary contact 191. This indicates that the flow of material into the bucket has tilted the scale enough to lift two of the three poises and to open two of the three contacts, thus terminating the fast and intermediate feeds, while only the slow feed continues.

This is shown in the wiring diagram, in which the circuit through the main magnet 48 is interrupted, while the circuit through the auxiliary magnet 96 is still maintained. For the sake of completeness, Fig. 16 may be further explained. Alternating current from an ordinary power line is supplied to terminals 192. This current passes through a single wave rectifier 194 which may be of the vacuum tube or electron emission tube type, or any other suitable single wave rectifier. The rectified energy is then supplied to main and auxiliary magnet coils 48 and 96. The intensity of vibration produced by magnet 96 is adjusted by means of a series resistor 196. The energization of magnet 48 is adjusted by means of two adjustable resistors 198 and 200 connected in parallel. The three resistors are then connected to the control contacts, and a common grounded return 202 from the contacts leads back to terminals 192 through contacts 204 bearing against a rotating control drum 206, the purpose of which will be later described. A resistor 49 may be connected across vibrator coil 48 to reduce sparking at the contacts.

It will be evident that at the beginning of the weighing operation, with all of the contacts closed, the magnet coil 48 is vibrated with maximum current, the resistance in series being reduced by the parallel connection of resistors 198 and 200. When contact 186, 187 is opened, the effective resistance in series with coil 48 is greatly increased because the parallel path through resistor 200 is open-circuited, and the vibration of the main trough is thereby reduced so as to change the feed from fast to intermediate. When contact 188, 189 is opened, the magnet coil 48 is deenergized and only magnet 96 remains energized. This vibrates the auxiliary trough for a slight dribble feed. When contact 190, 191 is opened, the circuit through magnet 96 is broken and no further feed of material takes place.

This desired effect is obtained by suitable adjustment of the stationary contacts through their screw and reduction gear mechanism previously described. The adjustment is facilitated by means of micrometric control screw mechanism M. Reverting to Figs. 10 and 11, the cross-bar 140 of the scale beam is disposed between a motion limiting support 210 projecting inwardly from wall 212 of the scale housing, and the lower end 214 of a micrometer screw the upper end of which carries an enlarged head 216 with a scale engraved on the periphery thereof. The micrometer screw is threadedly received in a bracket 218 secured to support 210 by means of screws 220, and an indicating pointer 222 is mounted on bracket 218 and cooperates with the scale on the micrometer screw. It will be evident that by appropriately adjusting the screw, successive positions on the scale may be obtained which are separated by a few thousandths of an inch, and the contact adjusting screws may be adjusted to obtain opening of one and then another of the contacts, depending on the successive positions of the scale beam. In this way, the contacts may be opened by differences of only, say, two thousandths of an inch, and the complete range of permitted scale movement may be limited to say, ten thousandths of an inch. This movement is almost imperceptible to the eye, and the operation of the scale may be said to be substantially static.

The entire contact and adjusting mechanism of the scale is enclosed in a scale box covered by means of a suitable cover 224. The contacts themselves are thus doubly protected, first, by the enclosed contact box 160, and secondly, by the scale box with its cover 224. The possibility of dust getting between the contacts is thereby minimized.

The scale 144 for the sliding weight 146 may, for convenience, be marked with the total weight of the load, as, for example, 2 oz., 3 oz., 4 oz., etc. In such case, its effect is actually less by, say, one ounce, or more, the difference being made up by the three poises on the contact arms. These poises may be individually changed without changing their total weight in order to change the distribution of amount fed in the intermediate and slow feeds, these being, say, one-half ounce and one-tenth of an ounce, respectively, and varying with the nature of the material being weighed. They may also vary with the size of the package and speed of filling. For example, if a large size package is filled at high speed, the rate of fast feed must be very high, and the amount of falling material will therefore be great and may necessitate an increase in the poise for the intermediate feed contact. A change in the total poise weight may be compensated for by the adjusting nuts 150.

The tilting bucket

The bucket is divided into a number of compartments and during the charging and weighing period is held locked in such a manner that one compartment is always on top to receive the load. When this compartment is full and has received the required load as determined by the setting of the sliding weight, the bucket is made to rotate through a definite arc thereby discharging or dumping the contents of the loaded compartment through a chute and presenting the succeeding and empty compartment to receive a fresh load. The bucket may have any number of compartments, but usually two, three or four are used for practical reasons.

The bucket is journaled within a cage-like frame work, and is locked and thereby prevented from rotating by means of a detent attached to the cage and engaging suitable notches cut in the periphery on one side of the bucket. The release of the loaded bucket, that is, the withdrawal of the detent from its engaging notch, is accomplished by means of a trip finger which, however, during the weighing operation does not touch the detent, and so allows the scale freedom of action for accurate weighing.

Not until after the load has been weighed and is ready to be dumped does this finger touch and then trip the detent, thereby releasing the bucket. The tripping finger also sets in motion a pusher device that gives the bucket its initial forward motion, the resulting shifting of the center of gravity with reference to the axis of the bucket and momentum being then sufficient to complete the movement of the bucket.

Referring now to Figs. 10, 11, and 12 of the drawings, the revolving bucket comprises two substantially circular side walls 230 between which are secured compartment or bucket walls 232. In the present case, there are four compartments, but it will be understood that a somewhat lesser or greater number may be provided. The bucket is rotatably carried on a spindle 234 the ends of which are rotatably received in the depending arms 236 of a cage generally designated 170. The cage is made up of two spaced parallel three-armed members, there being sidewardly and upwardly projecting arms 238 and 240, as well as the depending arms 236 previously referred to. The arms are secured at their ends to spacer rods 242. These come outside the revolving bucket and do not interfere with movement thereof, nor with free dumping into the funnel F, as will be seen in Fig. 1.

At a point above the center of gravity of the cage and bucket, the cage is provided with outwardly projecting knife edge bearings 244 which rest on appropriate conventional jeweled or stone bearings carried at the ends of scale beam arms 134. To maintain the cage in desired erect position during operation of the scale, I provide parallel motion mechanism consisting essentially of links or stays 246 (Figs. 1 and 10) extending horizontally between pins 248 on depending cage arms 236 and bearings 250 which are in vertical alignment with the main knife edge bearings of the scale beam.

Referring to Fig. 10, it will be seen that the upwardly disposed bucket compartment is located toward one side of spindle 234. As the bucket is loaded, it tends to tilt from loading to discharge position. It is prevented from doing so by a detent roller 252 carried at the lower end of a detent arm 254 which is secured to a tubular member 256 oscillatable outside the cage rod 242 (see Figs. 10 and 13). The detent cooperates with notches 258 cut in the periphery of the side plates 230 of the bucket. This prevents tilting of the bucket during the weighing operation. At the end of the weighing operation, detent roller 252 is moved in a clockwise direction, thus releasing the bucket for tilting to discharge position. This is done by energization of a solenoid coil 260. When coil 260 is energized, it pulls solenoid core 262 to the left, as viewed in Fig. 10, and this, through the agency of link 264, turns arm 266 and shaft 268 counterclockwise. Shaft 268 oscillates trip finger 270 counterclockwise and a pin 272 on the upper end of finger 270 bears against the lower end of arm 274, thus turning the same clockwise. Arm 274 is secured to sleeve 256, and consequently moves the detent in a clockwise direction or out of the path of the bucket wheel. It should be noted that pin 272 is normally free of engagement with arm 274, there being a substantial clearance therebetween, thus avoiding any resistance to movement of the scale during the weighing operation. When the pin 272 strikes the arm 274, the weighing operation is already completed. The other parts associated with the cage all move with the scale beam and therefore do not introduce an error in weighing.

When weighing and packaging small amounts of material, the tilting force on the bucket is slight and I therefore provide additional means to insure dependable tilting irrespective of the weight of material. For this purpose, I provide a pusher finger 276 (Fig. 10) which bears against a partition of the bucket. This pusher finger is slidably carried at the upper end of an arm 278 projecting upwardly from the middle of sleeve 256, as is best shown in Fig. 13. Finger 276 is slotted at 280 to receive a pin 282, thus providing a lost motion connection which permits the detent 252 to be released while pusher 276 is stationary. A spring 284 is coiled about the pusher and is compressed during release of the detent. When the detent is released, so that the bucket can move, it is pushed by expansion of spring 284, thus insuring dependable tilting of the bucket.

The energization of the solenoid 260 is brief, and thereafter detent wheel 252 rides against the periphery of the bucket until the next detent notch 258 is reached, whereupon the bucket is again stopped. The restoring movement of the detent and solenoid core is obtained by means of a pull spring 286 (Fig. 10), one end of which is connected to a post 288 secured within the scale box, and the other end of which is connected to a member 290 which is connected to a downward extension 292 of trip arm 266 previously referred to. It will be seen that spring 286 pulls arm 266 in a clockwise direction, thus restoring solenoid core 262 to its outward position and moving finger 270 in a clockwise direction, thus permitting arm 274 and detent 252 to move in a counterclockwise direction.

When the detent 252 is again engaged by one of the notches 258, there may be a slight shock or bump as the tilting bucket is brought to rest. It is desirable to absorb this shock in order not to transmit the same to the scale bearings. This is done by shock absorbing mechanism which may be described with reference to Figs. 14 and 15 of the drawings. The links 248 of the parallel motion mechanism are connected to bearings 250 (one on each side of the scale) which, however, are not fixed stationary bearings, but instead are carried on the depending arms 300 of angle levers, the other arms 302 of which extend sidewardly and normally bear against adjustable stop screws 304. The angle levers are pulled against screws 304 by means of pull springs 306. Referring to Fig. 15, it will be seen that the center or disk-like bearing of the angle lever is received between friction disks 308 and 310, said disks being urged together on opposite sides of the angle lever by means of a pull spring 312 extending transversely across the scale and pulling headed pins 314 toward one another. These parts are disposed on the main supports 316 of the scale beam fulcrum bearings.

It will be evident that when the bucket tilts and strikes the detent, the force is applied to the cage and tends to oscillate the cage in a clockwise direction. This causes a movement of link 248 toward the left, which in turn causes a clockwise movement of angle lever 300, 302 against the restraining influence of spring 306 and the friction brake disks 308 and 310. The impact is thus absorbed and the parts are restored to normal position without sustained vibration.

The operation of solenoid 260 is obtained in a manner which will be clear by reference to Fig. 16. Drum 206 is turned in synchronism with the packaging machine, as by means of gearing or chain sprocket gear 320 connected to a shaft of the packaging machine. A contact 322 on drum 206 functions to connect brushes 324 once for each revolution of the drum. These brushes are connected in series with solenoid 260 and the power line terminals 192. The drum 206 is also provided with a main contact 326 which extends for a substantial distance around the periphery of the drum, but not including the angular part occupied by contact 322. Contact 326 serves to connect the brushes 204 which are in series with the lead 202 connected to the scale contacts. It will thus be evident that the complete available time represented by each operation of drum 206 is divided into a weighing portion determined by contact 326, and a tilting portion determined by contact 322. No feed of material or weighing takes place during the tilting of the bucket, and the feeds of material must be made fast enough to insure completion of the weighing operation within the allotted time.

If the weighing machine is used as a semi-automatic machine, that is, with a manual feed of packages to and from the weighing machine, then drum 206 is driven by a suitable timing motor, and the speed of rotation of the drum is adjusted to fit the ability of the operator of the machine.

In using a double unit, such as is shown in Fig. 2, the two scales may be operated in unison, in which case the conveyor is so arranged as to intermittently move two empty packages to the scales at each movement of the conveyor.

Adjustment of the scale

The setting of the scale for operation is effected in the following manner. With empty bucket, the scale beam on the other side is in its lowest position and rests against the bottom stop 210. A depth micrometer screw M is provided by means of which the beam can be clamped in this zero position from above, the micrometer being made to read zero in this position. If now the sliding weight 146 on the scale beam is lifted up and temporarily removed, the beam will be so lightened that it will be overbalanced by the empty bucket, and will have a tendency to leave the stop and always bear on the lower end of the micrometer clamping screw. This screw is now released a certain amount which will give the beam the opportunity to rise, the total distance allowed being, say, four one thousandths of an inch. In this position the scale beam should cause the main feed contact to break. By slowly turning the contact screw of this lever, and by watching the main feed, or listening to its vibration, a setting is quickly reached when the main feed is stopped. The beam micrometer screw is now released another two one-thousandths of an inch and the second lever contact screw adjusted until the intermediary feed stops. The beam micrometer screw is further released by two one-thousandths of an inch and the third lever contact screw adjusted until the dribble feed stops. After this the beam micrometer screw is released an additional two one-thousandths of an inch for clearance, and is left in that position. While making the adjustments of the three contacts, it is of course convenient to cut in the circuits under test one at a time by means of switches 195, 197, and 199, Figure 16, the other two circuits remaining open.

After replacing the sliding weight the scale is ready for counter-balancing. The slide weight is now set for any chosen weight, say four ounces. The bucket is allowed to be filled by the feeders under the control of the three contacts and the amount in the bucket is checked on a separate scale. If this weight is more than four ounces the balancing counterweight 150 provided on the scale is moved one way, if less than four ounces, the other way, until a point is reached when the bucket will deliver exactly four ounces. The scale is now properly counter-balanced and will deliver any weight in accordance with the setting of the sliding weight.

Contrary to common practice with automatic scales, once the scale is counter-balanced it is never touched or has its adjustment altered, and should there be any discrepancy between the setting and the results the fault will lie with the feeder, which either delivers too much material or too little, for it is obvious that if not enough material is delivered to the scale in the time allowed or available for weighing, the scale cannot possibly give the result required. On the other hand, if entirely too much material is discharged into the scale, the corrective action is greatly overtaxed, the falling material exceeds the control weights, and the required accuracy cannot be obtained.

Referring to Fig. 17, I there show a graph plotting actual loads obtained with the scale adjusted to measure out four ounces of material while varying the opening of the main gate from zero to ⅞". The weighing machine is accurate independently of gate opening, as is indicated by the horizontal part 330 of the curve. The sharp drop of the curve indicated at 332 is caused by a gate opening so small that insufficient material reaches the bucket in the allowable weighing time. In other words, at this time the weighing machine is unsuccessful because it has not been given an opportunity to weigh because the weighing operation has been terminated before an adequate amount of material has been supplied. The rise in the curve at 334 represents an error caused by over-delivery, due to a gate opening so large that the rate of feed of material from the main trough is so fast that the error caused by falling material exceeds the corrective effect or residue sought to be weighed in steps by the intermediate and slow feeds. The large flat portion 330 of the curve shows that the present machine is a true weighing machine and that it does not merely compensate for falling material by trial and error until the desired amount is obtained by the rhythm of the machine. Moreover, it should be kept in mind that the curve of Fig. 17 was obtained while dealing with cocoa pudding powder, which is not free flowing and which lumps in a way which would make it impossible to obtain accurate results while depending on rhythm and uniformity of falling material.

The feed requirements indicated in Fig. 17 are readily met by adjustment of the resistors 196, 198, and 200, or/and the gate G and door D. Large tolerance is permissible in these adjustments, and they need be changed only when changing the nature of the material being packaged, as from tea to cocoa, or when greatly changing the size of the package. In very rare cases, it may be desirable to change the poises on the contact levers, and in such case the nuts 150 will have to be readjusted.

It is, of course, understood that when a perfect balance is obtained at the end of the dribble period, the dribble feed contact is thereby not necessarily broken. The scale being at rest will not move except after the addition of a differential, and only then is the contact actually broken and the dribble feed stopped. A scale properly designed, light in weight, and free from friction losses, can be made to move with a differential so small that it will not appreciably affect the end results. Moreover, this differential is nearly constant and is absorbed in the process of calibrating and counter-balancing the scale by the adjusting nuts 150. The use of a drum type bucket is, of course, not essential.

Operation

With the above in mind, a more detailed description of the operation will be better understood. The scale is provided with a sliding weight which can be set for any desired package weight. The beam is arranged to pick up three additional weights which are arbitrarily chosen and found by experiment to give satisfactory results. By picking up these three weights, three contacts are broken one after each pick-up, each contact controlling a circuit set for a definite amplitude of vibration for the feeder. The calibration of the scale and the counter-balancing of the parts involved are such that when the last weight is picked up and the last contact (dribble) is opened, the weight in the bucket corresponds exactly to the weight for which the sliding weight is set. The three weights to be picked up by the beam are designed in the form of loaded levers, pivoted by means of jeweled point pivots near the main fulcrum of the scale beam, but entirely independent of it. Each lever carries a movable contact point engaging a corresponding stationary contact point which can be set from without with micrometer precision. The load on the levers keeps these contacts normally closed, that is, when the bucket is empty, no physical connection exists between the beam and the levers and all three contacts are closed because of the loads or poises acting on the levers. When, however, sufficient weight has been discharged into the bucket to balance the sliding weight, the beam will move up slightly and bear against the loaded lever controlling the fast feed. A further discharge of material into the bucket will now equal the sliding weight plus the load on the first lever, and as soon as this condition is reached or exceeded the loaded lever will be lifted by the beam, thus transferring the closing pressure of the contact to the beam. Only a very small motion of the beam is required to break this first contact, whereupon the fast feed stops while the intermediary and dribble feeds continue. When the first contact is opened, the current supply to the main vibrator magnet is sharply diminished and the vibration of the main trough is reduced, and this is what stops the fast feed, or changes it to the intermediate feed, as will be clear from the wiring diagram of Fig. 16.

While this progresses, the beam moves upward until it is stopped by the second loaded lever against which the beam now bears. It is, of course, essential that the momentum of the scale be kept at such a small value that it will not hit this lever with a force great enough to break the contact. It is for this reason that the scale is allowed only one- or two-thousandths of an inch movement, for in the time required to move the structure through this small interval, the velocity that it assumes is still small and the impact when the beam reaches the second lever is smaller than the force which holds the lever down. In the meantime, the intermediary and dribble charges have discharged sufficient material into the bucket to force it down, and the other side of the beam up, until it is able to balance the second loaded lever and assume its load, transferring it from the closed contact to the beam. With the discharge still going on, a point will be reached when the beam will just overcome the load of the second lever and break the contact controlling the intermediary feed, which stops the latter, leaving only the dribble feed to discharge the balance of the required material into the bucket. The opening of the second contact breaks the circuit to the main vibrator magnet, as will be clear from the wiring diagram of Fig. 16.

The scale beam will, as before, move up slightly until it reaches the third loaded lever, this movement again being limited to one or two thousandths of an inch to prevent the system from acquiring any appreciable velocity, and when the dribble feed has discharged whatever small quantity of material is still required to balance the light load of the third lever plus an additional small differential, it will break the contact controlling the dribble feed and end the weighing operation. The manner in which opening of the third contact stops the current supply to the auxiliary magnet will be clear from the wiring diagram of Fig. 16.

It is, of course, imperative that any substantial friction in the mechanism be avoided to insure accuracy in the results. This makes it desirable to provide jeweled point pivots for the three levers, and anti-friction rollers at the point where the beam picks up the levers. Also, a line joining these two points, namely, point of physical contact between lever and beam, and jeweled point pivots, should, when extended, pass through the main knife edge of the beam upon which the entire scale rests. The arbitrarily chosen loads on the three levers are preferably suspended from the ends of these levers from knife edges, but solid weights attached to the arms are also practical.

The weighing operation is completed within the allotted time, and thereafter the synchronizing drum energizes a tripping solenoid which releases the detent of the bucket and tilts the bucket to discharge the contents thereof. The tilting of the bucket, while emptying one compartment, brings another compartment into loading position, and the synchronizing drum thereupon energizes the rectifier and vibrator units which then go through the cycle previously described.

The operation of the scale is so rapid that an observer would hardly detect the three stages of operation. To the onlooker, there appears to be merely one quick dumping of a bulk of material from the main trough into the bucket. This dumping of material appears to simply stop, the slowing up for intermediate feed being almost imperceptible and seeming to be a part of the stoppage of flow. With careful observation, one will notice the subsequent dropping of a few particles of material from the dribble trough into the bucket, but this also stops very quickly after the stoppage of the main flow. The movement of the scale is imperceptible unless very carefully watched. An instant later, the bucket dumps, and another weighing operation begins. The operation seems so casual and rapid that one is surprised, on taking random samples of the output of the machine, to find how extraordinarily accurate a result is obtained.

It is believed that the construction and operation, as well as the method of adjustment and the many advantages of my improved weighing machine, will be apparent from the foregoing detailed description thereof. It will also be apparent that while I have shown and described my invention in a preferred form, many changes and modifications may be made in the structure disclosed without departing from the spirit of the invention defined in the following claims.

I claim:

1. An automatic weighing machine comprising a main delivery trough, means for causing movement of material therealong at a rapid rate, an auxiliary trough located beneath the main trough for dribble delivery of a small amount of material, an adjustable gate beneath the main trough for feeding a small amount of material downwardly from the main trough into said dribble trough, means for causing movement of material along the dribble trough, a scale for receiving the discharge from both the main and dribble troughs, and means controlled by said scale for interrupting the feed of the main trough when the delivered material approaches the desired weight and for interrupting the feed of the dribble trough when the material reaches the desired weight.

2. An automatic weighing machine comprising a main delivery trough, means including an electro-magnetic vibrator for causing movement of material therealong, an adjustable gate for determining the level of material in the trough, a subordinate trough located beneath the main trough for dribble delivery of a small amount of material, an opening for feed of material from the main trough to said dribble trough, means including an electro-magnetic vibrator for causing movement of material along the dribble trough, a scale-carried bucket for receiving the discharge from both the main and dribble troughs, and electric contact means controlled by the scale for controlling the energization of said vibrator means in order to control the rate of feed of material to the bucket.

3. An automatic weighing machine comprising a main frame, a sensitive scale mounted in said main frame, a feed trough, a feed frame, supports extending from said feed frame to said trough, means for causing vibration of the trough relative to the feed frame, said feed frame being secured to the main frame by connections at the neutral or nodal points of the supports, whereby the main frame is substantially free of vibration of the feed trough and reactive vibration of the feed frame.

4. An automatic weighing machine comprising a main frame, a sensitive scale mounted in said main frame, a hopper and feed trough leading therefrom to said scale, a feed frame, spring strips extending from said feed frame to said trough, means mounted on said feed frame for causing vibration of the trough relative to the feed frame, said feed frame being secured to the main frame by connections at the neutral or nodal points of the spring strips, whereby most of the vibration of the feed trough and feed frame is not transmitted to the main frame.

5. An automatic weighing machine comprising a main frame, a sensitive scale mounted in said main frame, a hopper and feed trough leading therefrom to said scale, a feed frame, spring strips extending from said feed frame to said trough, electro-magnetic means for causing vibration of the trough relative to the feed frame, said means including an electro-magnet mounted on the feed frame, and an armature vibrated by said magnet and connected to said trough, said feed frame being secured to the main frame by connections at the neutral or nodal points of the spring strips, whereby most of the vibration of the feed trough and feed frame is not transmitted to the main frame.

6. An automatic weighing machine comprising a main frame, a sensitive scale mounted in said main frame, a relatively light hopper and feed trough leading therefrom to said scale, a relatively heavy and massive feed frame, strips extending from said feed frame to said trough, electro-magnetic means for causing vibration of the trough relative to the feed frame, said means including a relatively heavy and massive electro-magnet mounted on the feed frame, and a relatively light armature vibrated by said magnet and connected to said trough, said feed frame being secured to the main frame by connections at the neutral or nodal points of the strips, whereby vibration of the feed trough and the lesser opposite or reactive vibration of the feed frame are for the most part not transmitted to the main frame.

7. An automatic weighing machine comprising a scale beam carrying a bucket at one end, a pluratily of control devices disposed near the other end, each of said devices including a poise and an electric contact, means carried by the scale beam for successively picking up the poises in order to cumulatively load the beam with the poises as the load in the bucket overcomes the weight of the preceding poise, the resulting lifting of the poises causing changes at the aforesaid contacts for controlling the feed of material to the bucket, the parts being so relatively arranged that the movement of the scale beam needed for picking up the first poise and each of the succeeding poises is very slight and too small to permit the scale to acquire enough momentum to prematurely pick up any succeeding poise, and means limiting the total movement of the scale beam to approximately the desired amount.

8. An automatic weighing machine comprising a scale beam carrying a bucket at one end, a plurality of contact levers disposed near the other end, each of said levers carrying a poise and an electric contact, means carried by the scale beam for successively picking up the poises in order to cumulatively load the beam with the poises as the load in the bucket overcomes the weight of the preceding poise, the resulting lifting of the poises causing changes at the aforesaid contacts for controlling the feed of material to the bucket.

9. An automatic weighing machine comprising a scale beam carrying a bucket at one end, three contact levers disposed near the other end, each of said levers carrying a poise and a movable electric contact, stationary contacts cooperating with said movable contacts, means carried by the scale beam for successively picking up the poises in order to cumulatively load the beam with the poises as the load in the bucket overcomes the weight of the preceding poise, the resulting lifting of the poises causing changes at the aforesaid contacts for controlling the feed of material to the bucket, and precision screw means for adjusting the relative levels of the individual stationary contacts.

10. An automatic weighing machine comprising a scale beam carrying a bucket at one end, a plurality of contact levers disposed near the other end, each of said levers carrying a poise and a movable electric contact, stationary contacts cooperating with said movable contacts, means carried by the scale beam for successively picking up the poises in order to cumulatively load the beam with the poises as the load in the bucket overcomes the weight of the preceding poise, the resulting lifting of the poises causing changes at the aforesaid contacts for controlling the feed of material to the bucket, precision screw means for adjusting the relative levels of the individual stationary contacts, and micrometer screw and scale means for limiting the movement of the scale beam to desired amounts when adjusting the positions of the contacts by means of the contact screws.

11. An automatic weighing machine comprising a scale beam, a multiple compartment bucket rotatably carried in a cage at one end of the scale beam, said compartments being so disposed that when loaded they tend to tilt from loading to discharge position, a detent to prevent tilting, a trip member controlled by the action of external circuit control means for releasing said detent at the end of the weighing operation, parallel motion stays for holding the pivoted cage in desired position as the scale moves, and shock-absorbing means associated with said stays for permitting yieldable movement of the cage and absorbing the shock on the cage when the tilting bucket strikes the detent.

FRITZ P. MANSBENDEL.